(12) United States Patent
Yamada

(10) Patent No.: US 9,354,056 B2
(45) Date of Patent: May 31, 2016

(54) DISTANCE MEASUREMENT APPARATUS, DISTANCE MEASUREMENT METHOD, AND CAMERA

(71) Applicant: CANON KABUSHIKI KAISHA, Tokyo (JP)

(72) Inventor: Daisuke Yamada, Cambridge, MA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 494 days.

(21) Appl. No.: 13/747,767

(22) Filed: Jan. 23, 2013

(65) Prior Publication Data
US 2013/0222576 A1     Aug. 29, 2013

(30) Foreign Application Priority Data
Jan. 25, 2012   (JP) .................................. 2012-012971

(51) Int. Cl.
G01C 11/02   (2006.01)
G01C 3/32    (2006.01)

(52) U.S. Cl.
CPC . *G01C 11/02* (2013.01); *G01C 3/32* (2013.01)

(58) Field of Classification Search
CPC ..................................................... G01C 11/02
See application file for complete search history.

(56) References Cited

U.S. PATENT DOCUMENTS

| | | | | |
|---|---|---|---|---|
| 2008/0031611 | A1* | 2/2008 | Konishi | 396/102 |
| 2008/0265134 | A1* | 10/2008 | Kinoshita | 250/206 |
| 2011/0141344 | A1* | 6/2011 | Abe | 348/345 |
| 2011/0164165 | A1 | 7/2011 | Hashimoto | |

FOREIGN PATENT DOCUMENTS

| | | | |
|---|---|---|---|
| JP | H09-273927 | A | 10/1997 |
| JP | 4027113 | B2 | 12/2007 |

* cited by examiner

*Primary Examiner* — Jefferey Harold
*Assistant Examiner* — Justin Sanders
(74) *Attorney, Agent, or Firm* — Canon USA, Inc. IP Division

(57) ABSTRACT

A distance measurement apparatus includes an imaging lens configured to form an image of an object on an imaging plane, a solid-state image sensor configured to acquire an image based on light flux passing through a plurality of areas different from each other in an exit pupil of the imaging lens, and a calculation unit configured to calculate a distance based on a signal acquired from the solid-state image sensor. The calculation unit includes a processing unit configured to acquire a first signal in a first imaging condition by using the solid-state image sensor, a processing unit configured to acquire a second signal in a second imaging condition different from the first imaging condition by using the solid-state image sensor, and a processing unit configured to calculate a base length and a distance based on the first signal and the second signal.

17 Claims, 4 Drawing Sheets

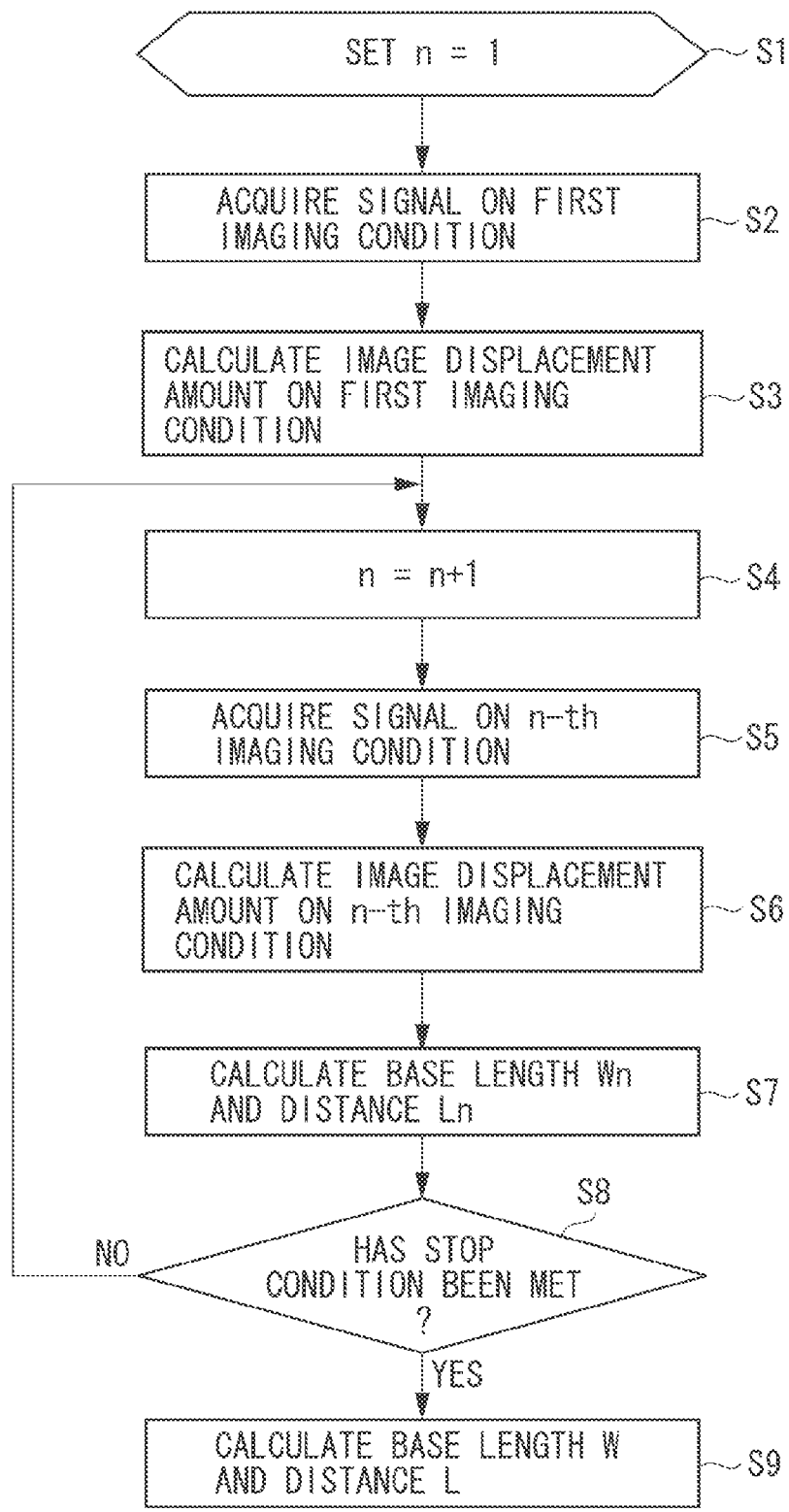

DISTANCE MEASUREMENT APPARATUS, DISTANCE MEASUREMENT METHOD, AND CAMERA

BACKGROUND OF THE INVENTION

1. Field of the Invention

One disclosed aspect of the embodiments relates to a distance measurement apparatus, a distance measurement method, and a camera, and more particularly, to an object distance measurement apparatus and an object distance measurement method for use in a digital still camera or a digital video camera.

2. Description of the Related Art

In a digital still camera or a video camera, U.S. Pat. No. 4,027,113 discusses a solid-state image sensor, in which distance measurement pixels having a distance measurement (focus detection) function are arranged at all or part of pixels of the solid-state image sensor to measure a distance in a phase difference method.

The distance measurement pixel includes a plurality of photoelectric conversion units and is configured such that light flux passing through different exit pupil areas of a imaging lens is guided to different photoelectric conversion units.

By using a plurality of distance measurement pixels, images by light flux passing through different exit pupil areas (image A and image B) are detected, and an image displacement amount of the image A and the image B is measured. A distance (focal position) may be calculated by calculating a defocus amount from the image displacement amount and a base length (interval between different exit pupil areas). In this case, distance accuracy is improved by exactly calculating the image displacement amount and the base length.

Also, United States Patent Publication Application No. 2011/0164165 discusses a method for improving distance accuracy by correcting a sensitivity difference of solid-state image sensors or asymmetry of an image A and an image B and accordingly exactly calculating an image displacement amount.

On the other hand, the base length, which is the interval between different exit pupil areas, is determined based on design values, considering sensitivity of a distance measurement pixel of a solid-state image sensor, a condition of an imaging lens, and vignetting of light flux by a lens frame.

However, the base length is sensitive to the sensitivity of the distance measurement pixel. Thus, if there is a manufacturing error in the solid-state image sensor, a base length error occurs. As a result, distance accuracy is worsened.

Furthermore, in an object that is not a perfect diffuse reflection such as a metal and has a strong angular dependency, light intensity distribution on a pupil is changed. Therefore, a base length is different from a set value. As a result, distance accuracy is insufficient.

SUMMARY OF THE INVENTION

One disclosed aspect of the embodiments is directed to providing a distance measurement apparatus, a distance measurement method, and a camera, which may improve distance accuracy even when an error occurs in a base length during the measurement of object distance information by using a phase difference method.

According to an aspect of the embodiments, a distance measurement apparatus includes an imaging lens configured to form an image of an object, a solid-state image sensor configured to acquire an image based on light flux passing through a plurality of areas different from each other in an exit pupil of the imaging lens, and a calculation unit configured to calculate a distance based on a signal acquired from the solid-state image sensor, wherein the calculation unit includes a processing unit configured to acquire a first signal in a first imaging condition by using the solid-state image sensor, a processing unit configured to acquire a second signal in a second imaging condition different from the first imaging condition by using the solid-state image sensor, and a processing unit configured to calculate a base length and a distance based on the first signal and the second signal.

According to another aspect of the embodiments, a camera includes the distance measurement apparatus.

According to yet another aspect of the embodiments, a distance measurement method includes, forming an image of an object by an imaging lens, acquiring an image based on light flux passing through a plurality of areas different from each other in an exit pupil of the imaging lens by a solid-state image sensor, and measuring distance of the object by an image displacement amount of the image which is detected by the solid-state image sensor and a base length which is an interval between the plurality of different areas in the exit pupil, wherein the distance measurement method includes acquiring a first signal which acquires an image displacement amount in a first imaging condition by using the solid-state image sensor, acquiring a first signal which acquires an image displacement amount in a second imaging condition different from the first imaging condition by using the solid-state image sensor, and calculating a base length by using the first signal and the second signal acquired in the acquisition of the first signal and the second signal, and measurement the distance of the object from a relationship between the image displacement amount and the base length.

Further features and aspects of the embodiments will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIG. 4 is a flow chart illustrating distance measurement processing according to a second exemplary embodiment.

DESCRIPTION OF THE EMBODIMENTS

Various exemplary embodiments, features, and aspects of the disclosure will be described in detail below with reference to the drawings. One disclosed feature of the embodiments may be described as a process which is usually depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

Hereinafter, an object distance measurement apparatus and an object distance measurement method according to exemplary embodiments will be described.

As an example of an image pickup apparatus to which the distance measurement method is applied, a digital still camera will be described, but the disclosure is not limited thereto.

Furthermore, in the following description with reference to the drawings, the same numbers are assigned to components having the same function throughout all the drawings, and redundant description thereof will not be repeated.

As the first exemplary embodiment, an example of a digital still camera to which a distance measurement method is applied will be described.

Figure 1:
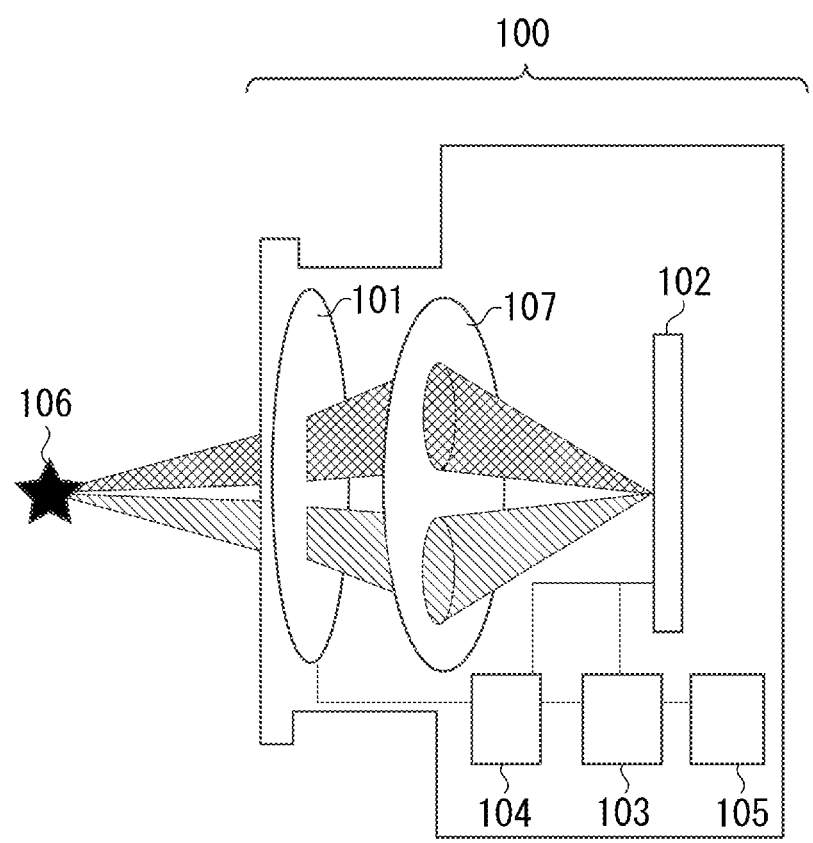
FIG. 1 is a schematic configuration diagram illustrating a distance measurement apparatus according to a first exemplary embodiment.

FIG. 1 illustrates a configuration example of a distance measurement apparatus for use in the distance measurement method. FIG. 1 illustrates a distance measurement apparatus 100 according to the first exemplary embodiment.

The distance measurement apparatus 100 includes an imaging lens 101, a solid-state image sensor 102, a calculation unit 103, a driving unit 104, and a memory 105.

In order to acquire distance information of an object 106, an image of the object 106 is formed on an imaging plane of the solid-state image sensor 102 by the imaging lens 101. Object images (image A and image B) by light flux passing through a plurality of areas different from each other in an exit pupil 107 of the imaging lens 101 are acquired by distance measurement pixels disposed in the solid-state image sensor 102. According to a distance measurement processing flow, which is to be described below, distance information of the object is measured from a relationship between an image displacement amount of the images which are detected by the solid-state image sensor 102 and a base length which is an interval between the plurality of areas different from each other in the exit pupil 107.

Figure 2:
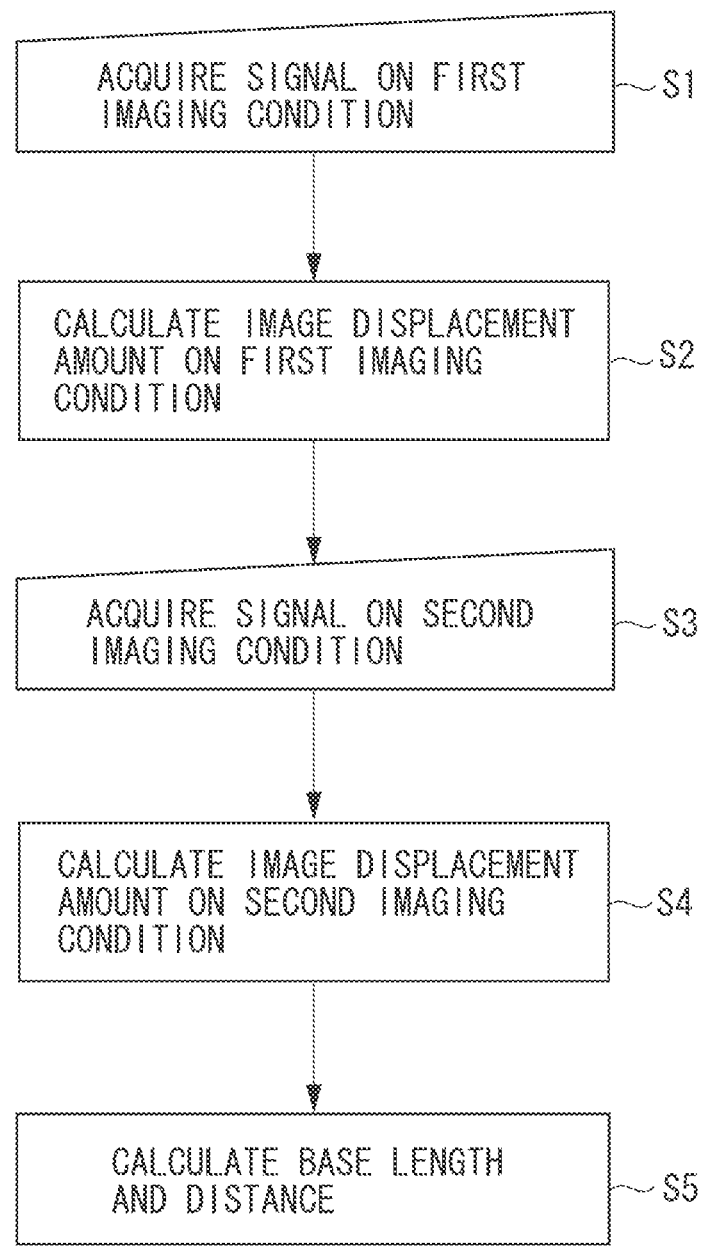
FIG. 2 is a flow chart illustrating distance measurement processing according to the first exemplary embodiment.

Next, the distance measurement processing flow according to the exemplary embodiment will be described. A processing flow of measuring a distance by setting a base length as an unknown amount will be described with reference to the flow chart of FIG. 2.

First, in step S1 and step S2, the solid-state image sensor is used to acquire an image displacement amount as a first signal in a first imaging condition. Specifically, in step S1, an image A and an image B of the object are acquired in the first imaging condition, and signals are transmitted to the calculation unit 103. The term "imaging condition" refers to a imaging state during distance measurement of, for example, the focal length of the imaging lens, the focus (principal point) position, and the position of the solid-state image sensor.

In step S2, the calculation unit 103 calculates an image displacement amount of the image A and the image B in the first imaging condition. The image displacement amount is calculated by correlation calculation of the pair of an image A and an image B, and any known method may be used for the correlation calculation.

Subsequently, in step S3 and step S4, the solid-state image sensor is used to acquire an image displacement amount as a second signal in a second imaging condition different from the first imaging condition. In other words, in step S3, the driving unit 104 is controlled to acquire the image A and the image B of the object in the second imaging condition. Then, signals of the image A and the image B are transmitted to the calculation unit 103. However, in the second imaging condition, the imaging is performed such that the distance to the object and the base length are substantially similar to those in the first imaging condition.

In step S4, the calculation unit 103 calculates an image displacement amount of the image A and the image B in the second imaging condition in a similar manner to in step S2.

Lastly, in step S5, distance information of the object is measured by calculating the base length from the geometric optics arrangement of the imaging lens and the solid-state image sensor by using the first signal and the second signal acquired in step of acquiring the first signal and the second signal. In other words, in step S5, the distance information of the object is measured by calculating the base length and a defocus amount based on the information of steps 1 to 4.

Figure 3:
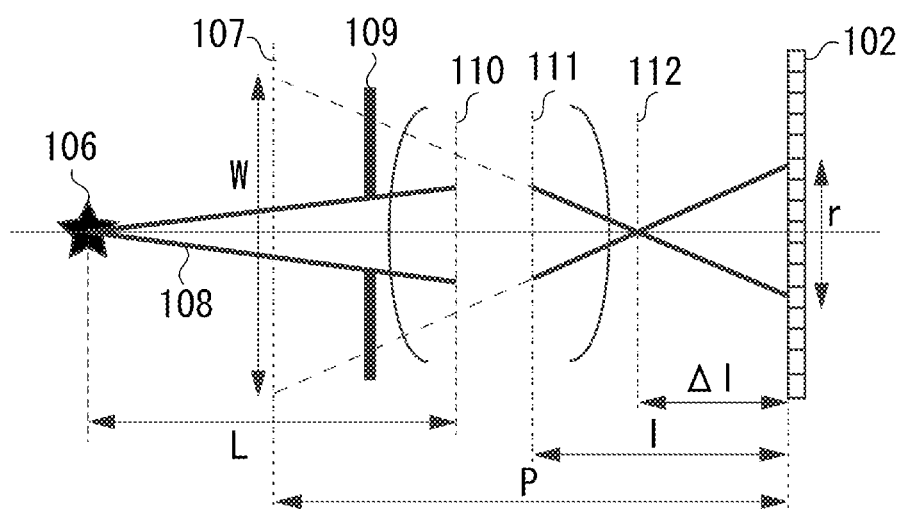
FIG. 3 is an optical arrangement diagram illustrating the distance measurement apparatus according to the first exemplary embodiment.

An example of the calculation method will be described using the optical arrangement of the distance measurement apparatus simplified in FIG. 3. FIG. 3 illustrates light beam 108 in a state where the object 106 is defocused in the solid-state image sensor 102. In FIG. 3, the optical arrangement includes an aperture stop 109, a front principal point 110, a rear principal point 111, and an imaging plane 112.

In this case, Equation 1 below may be obtained from a geometric light beam arrangement of an image side.

$$\frac{\Delta l}{r} = \frac{p - \Delta l}{W} \qquad \text{Equation 1}$$

Furthermore, Equation 2 below may be obtained from an image forming relation including the object 106 and the imaging lens.

$$\frac{1}{L} = \frac{1}{f} - \frac{1}{l - \Delta l} \qquad \text{Equation 2}$$

Where r is an image displacement amount, W is a base length, L is a distance between a front principal point and an object, l is a distance between a rear principal point and a solid-state image sensor, $\Delta l$ is a defocus amount, f is a focal length of a imaging lens, and p is a distance between an exit pupil position and a solid-state image sensor. Furthermore, when the imaging plane 112 is located at a more rear side than the solid-state image sensor 102, the defocus amount $\Delta l$ takes a negative value. In addition, if the imaging condition of the distance measurement apparatus is determined, l, f, and p are known values, and unknown parameters are W, L and $\Delta l$.

First, in the first imaging condition of step S1, Equation 3 and Equation 4 below may be obtained from Equation 1 and Equation 2.

$$\frac{\Delta l1}{r1} = \frac{p1 - \Delta l1}{W1} \qquad \text{Equation 3}$$

$$\frac{1}{L1} = \frac{1}{f1} - \frac{1}{l1 - \Delta l1} \qquad \text{Equation 4}$$

In this case, unknown parameters are three (W1, L1, $\Delta l1$). In a similar manner, in the second imaging condition, Equation 5 and Equation 6 below may be obtained from Equation 1 and Equation 2

$$\frac{\Delta l2}{r2} = \frac{p2 - \Delta l2}{W2} \quad \text{Equation 5}$$

$$\frac{1}{L2} = \frac{1}{f2} - \frac{1}{l2 - \Delta l2} \quad \text{Equation 6}$$

In this case, unknown parameters are three (W2, L2, Δ12). Furthermore, in the first imaging condition and the second imaging condition, the distance L from the front principal point to the object and the base length W meet Equation 7 and Equation 8 below because the imaging is performed in constant conditions.

$$L1=L2=L \quad \text{Equation 7}$$

$$W1=W2=W \quad \text{Equation 8}$$

When substituting Equation 7 and Equation 8 above into the four equations from Equation 3 to Equation 6, unknown parameters are four (W, L, Δ11, Δ12), and the unknown parameters may be uniquely solved. Therefore, the base length, the distance between the front principal point and the object, and the defocus amounts in the first and second imaging conditions may be calculated.

By using the above processing flow, the base length and the distance to the object may be calculated by setting the base length as an unknown value. Therefore, even when a base length error occurs due to a manufacturing error of the solid-state image sensor or object dependency, the base length may be exactly measured and used for distance measurement. Therefore, distance measurement accuracy is improved. In the processing flow illustrated in FIG. 2, in order to improve the accuracy of the image displacement amount, known processing of correcting the sensitivity difference of solid-state image sensors or processing of correcting image asymmetry based on the defocus amount may be used. In this case, the image displacement amount may be obtained with higher accuracy by using the calculated defocus amount in the processing of correcting the image displacement amount. In this manner, the distance accuracy of the distance measurement is improved.

Furthermore, the base length calculation method is not limited to the equations given in the first exemplary embodiment, and may be formulated to facilitate the unknown parameters or calculation processing. Even in this case, by performing imaging multiple times with a distance measurement apparatus using a phase difference method while changing the imaging condition, the base length and the distance to the object may be calculated based in the imaging condition and the output result.

Furthermore, the first imaging condition and the second imaging condition are set such that the focal lengths of the imaging lens or the focus positions are different. Generally, since the focal length and the focus position of the imaging lens are changed by the driving unit 104 to take a image, the same driving unit is used in the distance measurement apparatus. Therefore, the imaging condition may be quickly and easily changed.

Furthermore, if changing is a slight amount, photographing is performed in an identical condition of the distance to the object and the base length. Furthermore, in the first imaging condition and the second imaging condition, the position of the solid-state image sensor may be change. In this case, imaging may be performed in an identical condition of the distance to the object and the base length by slightly changing the solid-state image sensor without driving the imaging lens.

Furthermore, the base length calculated in the exemplary embodiment is stored in the memory 105 of the distance measurement apparatus and may be used in next imaging. In this case, as in the general distance measurement flow of the phase difference method, the distance may be measured from the base length stored in the memory and the image displacement amount acquired in the imaging. In this manner, the distance may be measured without imaging multiple times, and the distance accuracy of the acquired distance is higher than usual.

Furthermore, high-accuracy distance measurement may be achieved in the entire imaging conditions by storing the base length in the memory in each zoom state or focus state of the imaging lens and performing imaging after selecting the optimal base length according to each imaging condition.

Furthermore, the base length calculation processing flow is not limited to the flow described in the first exemplary embodiment, and the distance information of the object and the image of the object may be acquired at the same time by using the imaging lens and the solid-state image sensor. For example, the accurate base length may be calculated using the distance measured in the first imaging condition by using a provisional base length and the distance measured in the second imaging condition by using a provisional base length. In this case, even when a base length error occurs due to a manufacturing error of the solid-state image sensor, a base length error may be corrected at any time whenever imaging the base length error while taking a photograph as usual. Therefore, since the distance may be measured using the accurate base length, high-accuracy distance measurement may be achieved.

Furthermore, in the acquisition of the object image in the digital still camera including the distance measurement apparatus according to the first exemplary embodiment, the distance measurement pixel may be used as an image signal. Since the distance measurement pixel is configured such that light flux passing through different exit pupil areas is guided to different photoelectric conversion units, an object image signal is obtained by adding signals of the different photoelectric conversion units. In this manner, the distance measurement pixel may be used as a pixel for image of the object.

In the second exemplary embodiment, a distance measurement method for measuring distance of an object by changing imaging conditions multiple times will be described. Next, the distance measurement processing flow according to the exemplary embodiment will be described. The processing flow of measuring a distance by setting a base length as an unknown amount will be described with reference to the flow chart of FIG. 4.

First, in step S1, n is set to 1. In step S2, signals of an image A and an image B of an object are acquired in a first imaging condition and are transmitted to the calculation unit 103. In step S3, the calculation unit 103 calculates an image displacement amount of the image A and the image B in the first imaging condition. In step S4, 1 is added to n. In step S5, signals of an image A and an image B of the object are acquired in an n-th imaging condition and are transmitted to the calculation unit 103. In step S6, the calculation unit 103 calculates an image displacement amount of the image A and the image B in the n-th imaging condition. In step S7, a base length Wn and a distance Ln to the object are calculated based on information of the (n−1)-th imaging condition and the n-th imaging condition as in the first exemplary embodiment, and the base length Wn and the distance Ln are temporarily stored in the memory. In step S8, whether the imaging condition is changed to acquire the object image again is determined, i.e., whether the stop condition has been met. Specifically, if the stop condition has not been met, the process returns to step 4 until n reaches a predetermined value or an end signal is received from the exterior. In step S9, if the stop condition has been met, an effective base length W and an effective length L to the object are calculated using the base length Wn and the distance Ln to the object stored in the memory in step 7. As an example of enabling the calculation in such a manner, a method of taking an average value is given in Equations 9 and 10.

$$W = \frac{\sum_{2}^{n} Wn}{n-1}$$ Equation 9

$$L = \frac{\sum_{2}^{n} Ln}{n-1}$$ Equation 10

By using the above processing flow, the base length and the distance to the object may be determined by setting the base length as the unknown value. In this case, even when a base length error occurs due to a manufacturing error of the solid-state image sensor or object dependency, the base length may be exactly measured and used for distance measurement. Therefore, distance measurement accuracy may be improved.

Furthermore, since the distance is measured while changing the imaging condition multiple times, the base length and the distance to the object may be calculated with high accuracy even when an error occurs during imaging in the imaging condition at each time. In particular, the accuracy may be further increased by performing imaging three times or more.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2012-012971 filed Jan. 25, 2012, which is hereby incorporated by reference herein in its entirety.

What is claimed is:

1. A distance measurement apparatus comprising:
an imaging lens configured to form an image of an object;
a solid-state image sensor configured to acquire an image based on light flux passing through a plurality of areas different from each other in an exit pupil of the imaging lens; and
a calculation unit configured to calculate a distance based on a signal acquired from the solid-state image sensor,
wherein the calculation unit comprises:
a processing unit configured to acquire a first signal in a first imaging condition by using the solid-state image sensor;
a processing unit configured to acquire a second signal in a second imaging condition different from the first imaging condition by using the solid-state image sensor; and
a processing unit configured to calculate a base length which is an interval between the plurality of areas in the exit pupil and a distance based on the first signal and the second signal.

2. The distance measurement apparatus according to claim 1, wherein the first imaging condition and the second imaging condition are set such that imaging is performed in a condition that the base length and the distance are substantially equal, and geometric optics arrangement of the object, the imaging lens, and the solid-state image sensor are configured to be capable of calculating the base length and the distance.

3. The distance measurement apparatus according to claim 1, wherein the first imaging condition and the second imaging condition are different in a focal length of the imaging lens.

4. The distance measurement apparatus according to claim 1, wherein the first imaging condition and the second imaging condition are different in a focus position of the imaging lens.

5. The distance measurement apparatus according to claim 1, wherein the first imaging condition and the second imaging condition are different in a position of the solid-state image sensor.

6. The distance measurement apparatus according to claim 1, wherein the base length is calculated from at least three signals having different imaging conditions.

7. The distance measurement apparatus according to claim 1, wherein the base length is stored in a memory, and a value of the base length is used to calculate a distance in next imaging.

8. The distance measurement apparatus according to claim 1, wherein a distance and an image of the object are configured to be acquirable at the same time by using the imaging lens and the solid-state image sensor.

9. A camera comprising the distance measurement apparatus according to claim 1.

10. A distance measurement method comprising:
forming an image of an object by an imaging lens;
acquiring an image based on light flux passing through a plurality of areas different from each other in an exit pupil of the imaging lens by a solid-state image sensor; and
measuring distance of the object by an image displacement amount of the image which is detected by the solid-state image sensor and a base length which is an interval between the plurality of different areas in the exit pupil,
wherein measuring the distance m comprises:
acquiring a first signal which acquires an image displacement amount in a first imaging condition by using the solid-state image sensor;
acquiring a second signal which acquires an image displacement amount in a second imaging condition different from the first imaging condition by using the solid-state image sensor; and
calculating a base length which is an interval between the plurality of areas in the exit pupil by using the first signal and the second signal, and measuring the distance information of the object from a relationship between the image displacement amount and the base length.

11. The distance measurement method according to claim 10, wherein the first imaging condition and the second imaging condition are set such that the base length and the distance to the object are substantially equal, and the base length is calculated from geometric optics arrangement of the object, the imaging lens, and the solid-state image sensor to measure the distance of the object.

12. The distance measurement method according to claim 10, wherein the first imaging condition and the second imaging condition are different in a focal length of the imaging lens.

13. The distance measurement method according to claim 10, wherein the first imaging condition and the second imaging condition are different in a focus position of the imaging lens.

14. The distance measurement method according to claim 10, wherein the first imaging condition and the second imaging condition are different in a position of the solid-state image sensor.

15. The distance measurement apparatus according to claim 10, wherein the base length is calculated from at least three signals having different imaging conditions.

16. The distance measurement method according to claim 10, wherein the base length is stored in a memory, and a value of the base length is used to calculate a distance in next imaging.

17. The distance measurement method according to claim 10, wherein the distance information and the image of the object are acquired at the same time by using the imaging lens and the solid-state image sensor.

* * * * *